United States Patent Office 2,897,547
Patented Aug. 4, 1959

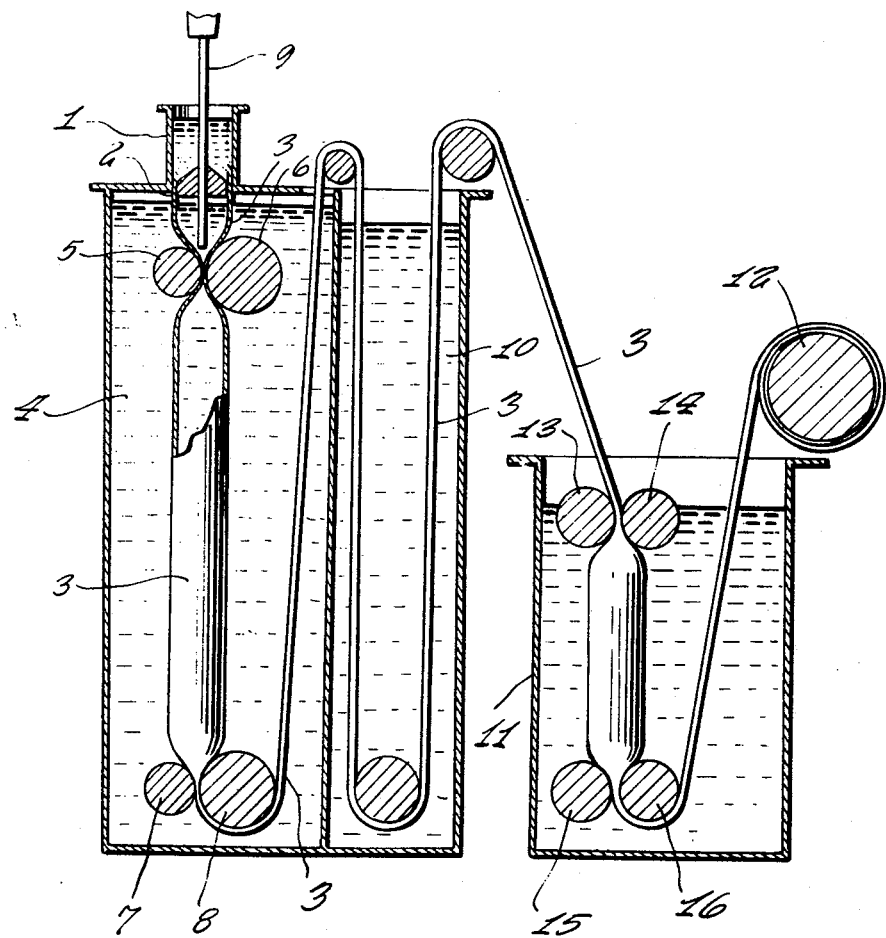

2,897,547

PROCESS FOR PRODUCING SYNTHETIC SAUSAGE CASING FROM ALGINATES OR ALGINIC ACID

Richard Weingand, Walsrode, Germany

Application May 27, 1955, Serial No. 511,721

3 Claims. (Cl. 18—57)

The invention relates to a process for producing synthetic sausage casing from alginates.

In the production of artificial sausage skins consisting of alginates or of alginic acid, particularly those which are to be used as edible substitutes for natural thin-walled sausage casings in the manufacture of frankfurters or wieners or similar sausages, certain shortcomings were found to be present.

It is the object of the present invention to overcome the inconveniences hitherto occurring and to provide a simple process of making from alginates synthetic sausage casings which are satisfactory in every respect.

It has been found that synthetic sausage casings consisting of alginates or of alginic acid, due to their considerable plastic longitudinal extensibility, have the tendency of becoming unduly lengthened during the procedure of smoking or curing the sausages. While undergoing this treatment, the sausages are suspended in a continuous chain on an elongated beam, with their one ends resting against the said beam. From time to time these ends are lifted in order to give access to the smoke and either the tilting of the beam which occurs about the longitudinal beam axis during this lifting operation or the protracted resting of the skins upon the beam give rise to the above mentioned elongation. This imparts to the finished smoked sausages an irregular unsightly appearance which is detrimental to a product of quality.

Extensive experimental work has led to the improvement, according to the invention, which makes it possible to avoid the undesirable longitudinal extension of synthetic sausage casings consisting of alginates or of alginic acid during the manufacture of the sausages. This can be done by subjecting the casings in the course of their production to a mechanical change in the properties of their walls. In this way it is possible to prevent the above-described change in the sausage casings, after they have been filled with sausage meat and when they are suspended during smoking or otherwise.

In order to achieve this purpose according to the invention, when an alginate solution is used as a starting material and a seamless tube is made by passing the solution through an annular nozzle into a coagulating bath, the tube is subjected to a mechanical traction in longitudinal direction, while being simultaneously prevented from undergoing shrinkage in transverse direction, before it is subjected to final coagulation.

With an alginate sausage casing or a sausage casing of alginic acid made in that manner, plastic, i.e. non-reversible extensibility in longitudinal direction is almost completely eliminated, and at the same time a certain elastic longitudinal extensibility is obtained. Consequently, after filling with sausage meat and after being suspended for smoking, the casings will not undergo any considerable plastic longitudinal extension; on the contrary, they will exhibit a low amount of shrinking tendency in longitudinal direction and they will yield to this longitudinal shrinking tendency during the heating of the sausages which follows the smoking as the last step of manufacturing frankfurters or similar sausages. In this way, the undesirable extension and ungainly change of shape will be avoided in the finished sausage which may be boiled before consumption as usual. The favorable properties just mentioned will be permanent, when the alginate or alginic acid sausage casing is stretched already during coagulation and not after complete processing. In the latter case, the improvement will only last for a few days. When made according to the invention, the sausage casing may even be stored for a comparatively long period before use, without losing the improved properties.

The mechanical traction in longitudinal direction which is to be applied according to invention during the production of the sausage casing from an alginate solution should be exerted not directly behind the annular nozzle shaping the seamless tube but, in order to produce a permanent orientation of the micels of the casing wall, at a point in the coagulating bath, where the tube has already been solidified to a certain extent; only then will the micels be set in the stretched state by the action of the further coagulation and dehydration. The intensity of the mechanical traction may be so chosen, in dependence on the alginate solution used for making the casing and on the details of the process used, that the shrinking tendency of the tube in the coagulating bath will just be compensated and, consequently, no change of length of the tube will be caused; or, the mechanical traction may so be chosen that there is a stretching of the casing resulting in a certain elongation. Under certain conditions the mechanical traction may be adjusted to allow a small longitudinal shrinkage and consequently a shortening of the tube.

For carrying out the process according to the invention, an aqueous alginate solution may first be formed by extrusion through an annular nozzle whereupon the so shaped seamless tube is first permitted to pass freely over a short path through a coagulating bath consisting e.g. of a 15% calcium chloride solution; thereafter the tube is conveyed over two rotatable conveyer rollers arranged at an appropriate distance from each other. In order to obtain a secure, slip-free passage of the tube, the rollers may have a rough surface so as to positively drive the tube without any possibility of sliding. The rollers may rotate at equal speed or at different speeds. The rotational speeds of the two rollers are so adjusted that a mechanical traction is effected on the tube during its travel from the one to the other roller. Depending on the ratio of the speeds, this traction will either serve to compensate the longitudinal shrinkage of the tube in the coagulating bath, completely or substantially; or, in other cases, it will serve to effect a stretching of the tube resulting in a certain elongation.

It is advisable to make the mutual distance of the two rollers, between which the tubular casing, not yet completely solidified, undergoes mechanical traction, not too small, since the traction in order to produce a permanent result should be acting on the several portions of the tube and their micels during a certain longer period. As a rule, the distance between the two rollers will be several meters, for instance 8 meters. The exact value of the stetching or of the elongation of the tubular casing should be adjusted in each individual case according to the thickness of the wall and to the diameter of the tube and also in accordance with the concentration of the starting solution of the alginate. This adjustment may be done by a change in the number of revolutions of one or both rollers.

The stronger the traction between the rollers on the not quite solidified casing in longitudinal direction, the higher will be the shrinkage in the portions of the wall abutting against the supporting beam when the finished casings of alginate or alginic acid tubing, after having been filled with sausage meat, are suspended for smoking on the beam. In general, it will be appropriate to have the forward roller in the direction of travel of the casing, run by about 10% faster than the rear roller.

In order to counteract a transverse shrinkage during the traction in the longitudinal direction of the tube, the tube may be filled in the portion between the two traction rollers with a gaseous or liquid agent, particularly with coagulating liquid, so that the diameter of the tube will be prevented from shrinking by the interior pressure acting on the wall and counteracting any shrinkage tendency. For this purpose, an interior pressure equalling a water column of 100 cm. will be sufficient, when the extension of the tube will not exceed 10% per unity of length.

The invention will now be more fully described in an example, but it should be understood that this is given by way of illustration and not of limitation and that many changes can be made in the details without departing from the spirit of the invention.

*Example*

A 6% solution of sodium alginate in water is fed through an annular orifice into a coagulating bath containing 10% calcium chloride. About 1 m. after escaping from the annular orifice, the shaped tubular casing is subjected to a strong longitudinal traction, resulting in an elongation of about 10%, by being passed over two rollers placed at a distance of about 8 m. from each other. These rollers have a rough surface and therefore take along the tube without any slippage. The roller which is reached later by the tube has a 10% higher circumferential speed than the other roller. Simultaneously, the tubular casing is filled between the rollers with 10% calcium chloride solution to such an extent that it will have an internal pressure of 0.1 atmosphere super-pressure. The tube is finished by rinsing.

When filled with water to a height of 1 meter the tube has a longitudinal elongation of 4% and shows also a considerable increase of the bursting pressure i.e. of the resistance against bursting during the filling with sausage meat and during the boiling of the sausage. Furthermore, sausages made with these casings undergo only slight shrinkage during smoking and will not be subject to change of shape due to elongation of the portions in contact with the supporting beam. They will consequently have the desired unmarred appearance.

If it is desired to treat the finished tubing of alginate or alginic acid after washing with a softener, which is often required, care should be taken that the state of longitudinal and transverse stretching, in which the tube leaves the washing bath, be maintained. This can be achieved by exposing the tubular casing while it is passing the bath of the softener to an appropriate internal pressure of about 0.1 atmosphere-superpressure. For that purpose the tube may be filled with the required amount of a suitable liquid, preferably with a softener, before it enters the softening bath.

In the following the process according to the invention will be described with reference to the accompanying drawing which is a diagrammatic illustration of a device for effecting traction on the sausage casing formed from an alginate solution while it is passed through the coagulating bath. The receptacle 1 contains the aqueous alginate solution serving as starting material for the manufacture of synthetic sausage casings and which is forced through the annular nozzle 2 in the form of a seamless and endless tube 3 into the coagulating bath 4. At a distance of about 1 m. from the nozzle 2 there is in the coagulating bath 4 a first pair of squeezing rollers 5 and 6, and at a further distance of about 8 m. a second pair of squeezing rollers 7 and 8. The rollers 6 and 8 have a rough surface and are positively driven by an electric motor not shown and the circumferential speed of the roller 8 is, for instance about 10% higher than the circumferential speed of the roller 6. Consequently, the two rollers 6 and 8 act upon the shaped tube 3 not only as driving but also as stretching means before it will be finally coagulated and solidified, and the degree of stretching may be regulated by varying the difference between the speeds of the driving rollers 6 and 8.

The rollers 5 and 7 serving only as idly running tube squeezing members which allow the tube portion situated between the two roller pairs to be filled through the pipe 9 transversing the annular nozzle 2 and ending in the interior of the tube 3 with a gaseous or liquid fluid, preferably with a coagulating liquid, so as to produce an internal super-pressure of about 0.1 atmosphere, whereby shrinkage of the tube wall in transverse direction is avoided. The stretched tube 3 is then conducted through a rinsing bath 10 and, if desired, additionally through a softening bath 11 and, finally, it will be wound up on the reel 12. In order to maintain the tube 3 in the stretched state when passing also through a softening bath, it is subjected in this bath 11 between two pairs of squeezing rollers 13, 14 and 15, 16 suitably distanced from each other to an interior super-pressure of about 0.1 atmosphere produced by a quantity of softener filled in into the tube at the beginning of the spinning process and remaining in this portion of the tube between the roller pairs 13, 14 and 15, 16 during the continuation of the operations.

What I claim is:

1. A process for the prevention of longitudinal extension of tubular sausage casing, made by extrusion of solutions of alginates, when filled with meat and suspended from a supporting beam, said process consisting of conducting said casing, during its production from an alginate solution by means of extrusion through an annular nozzle into a precipitating bath, through a portion of said bath without longitudinal tension and traction, and then subjecting said casing, while still in said bath but prior to its final coagulation, to a mechanical longitudinal traction, while preventing a transverse shrinkage, said traction being sufficient to permit at most only a slight shrinkage of the final casings when suspended from the supporting beam.

2. A process according to claim 1, wherein the mechanical traction is exerted to an extent effecting an elongation of the tube of about 10 percent.

3. A process according to claim 1, wherein the tube is maintained in the state produced by mechanical longitudinal traction without transverse shrinkage during passage through a softener bath, by filling softener into the tube so as to create an internal pressure of about 0.1 atmosphere super-pressure.

References Cited in the file of this patent

UNITED STATES PATENTS

| | | |
|---|---|---|
| 1,348,459 | Swett | Aug. 3, 1920 |
| 1,601,686 | Henderson | Sept. 28, 1926 |
| 1,645,050 | Henderson | Oct. 11, 1927 |
| 2,070,247 | Weingand et al. | Feb. 9, 1937 |
| 2,176,925 | Reichel et al. | Oct. 24, 1939 |
| 2,273,810 | Adams | Feb. 24, 1942 |
| 2,401,774 | Reichel | June 11, 1946 |
| 2,428,495 | Lesparre et al. | Oct. 7, 1947 |